(No Model.) 2 Sheets—Sheet 1.
A. E. & W. F. VROOMAN.
ONION TOPPER.
No. 580,742. Patented Apr. 13, 1897.
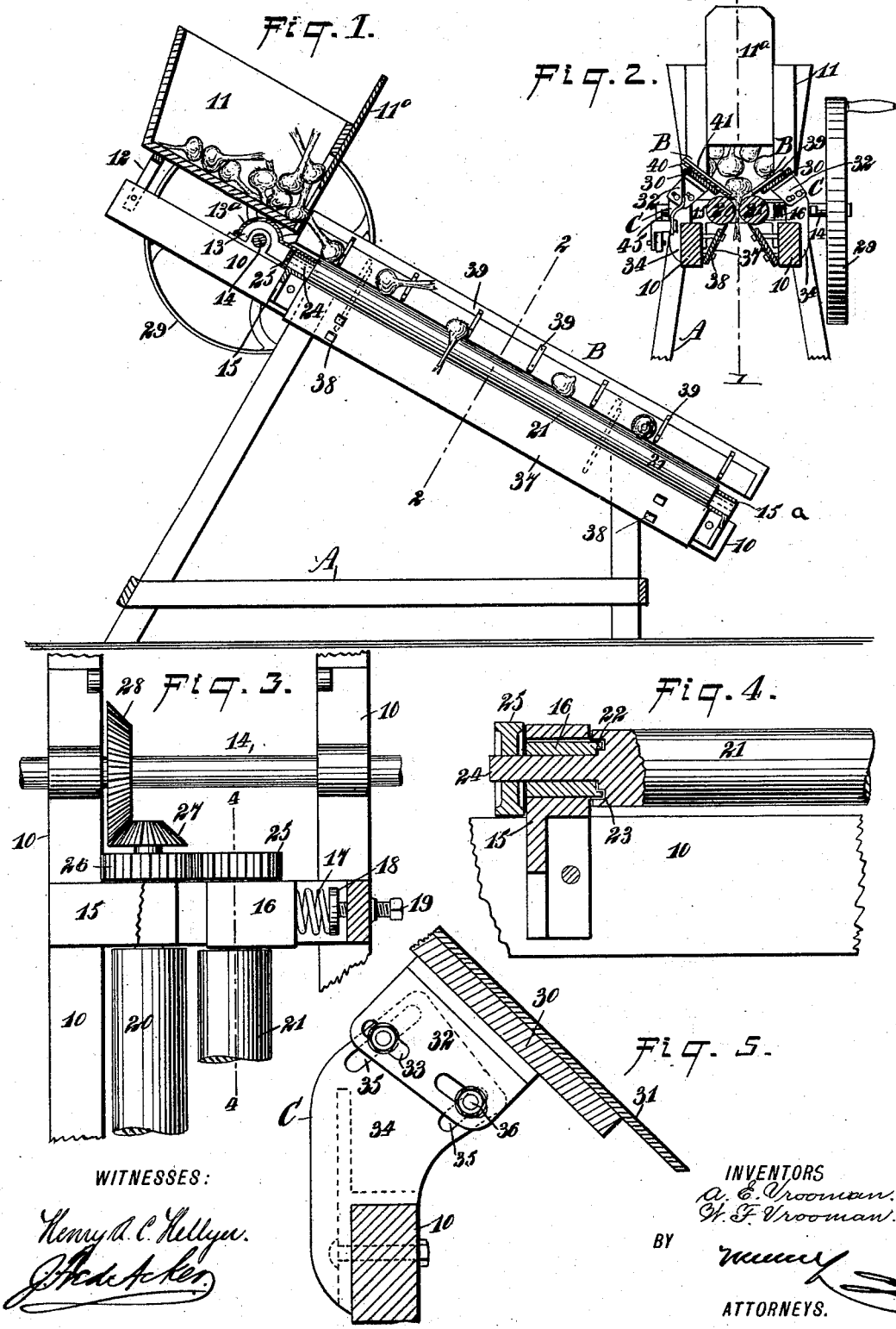
WITNESSES:
INVENTORS
A. E. Vrooman.
W. F. Vrooman.
BY
ATTORNEYS.

(No Model.)  A. E. & W. F. VROOMAN.  2 Sheets—Sheet 2.
ONION TOPPER.

No. 580,742.  Patented Apr. 13, 1897.

UNITED STATES PATENT OFFICE.

ARBA E. VROOMAN, OF ARTHUR, NORTH DAKOTA, AND WARREN F. VROOMAN, OF MADISON, OHIO.

ONION-TOPPER.

SPECIFICATION forming part of Letters Patent No. 580,742, dated April 13, 1897.

Application filed April 2, 1896. Serial No. 585,957. (No model.)

*To all whom it may concern:*

Be it known that we, ARBA E. VROOMAN, of Arthur, in the county of Cass and State of North Dakota, and WARREN F. VROOMAN, of Madison, in the county of Lake and State of Ohio, have invented a new and Improved Onion-Topper, of which the following is a full, clear, and exact description.

Our invention relates to a machine especially adapted for removing the tops from onions or other vegetables; and the object of the invention is to provide a machine which will expeditiously and cleanly remove the tops from the vegetables without bruising or otherwise injuring the vegetables and which will top out the small vegetables with equal rapidity, the machine being adapted to be run either by power or by hand.

Another object of the invention is to construct a machine for the purposes described which will be exceedingly simple, durable, and economic, and in which the various parts of the machine requisite for the work may be expeditiously and conveniently adjusted to meet all requirements.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 6:
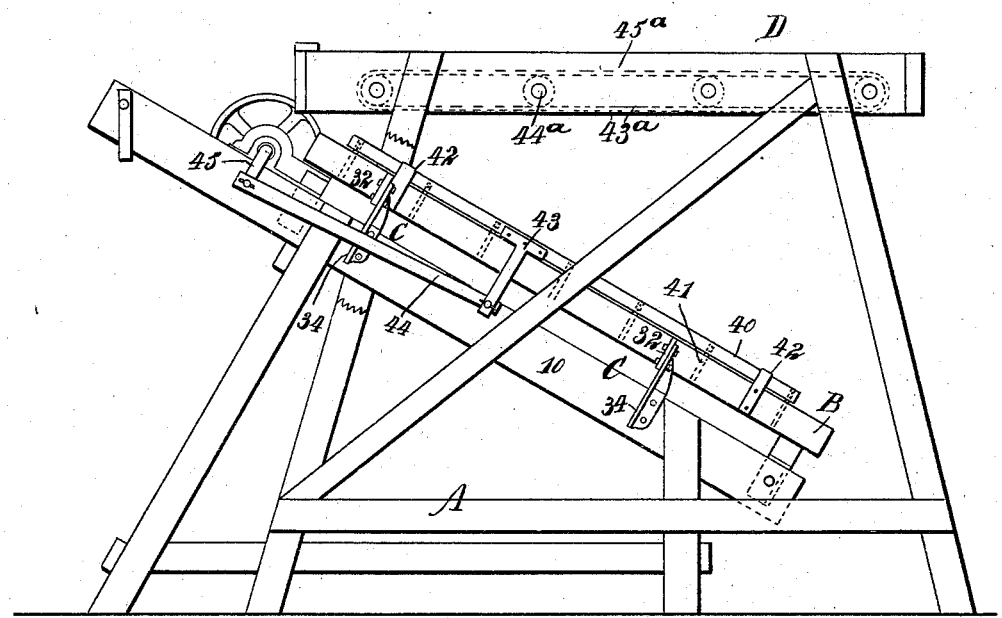
Figure 7:
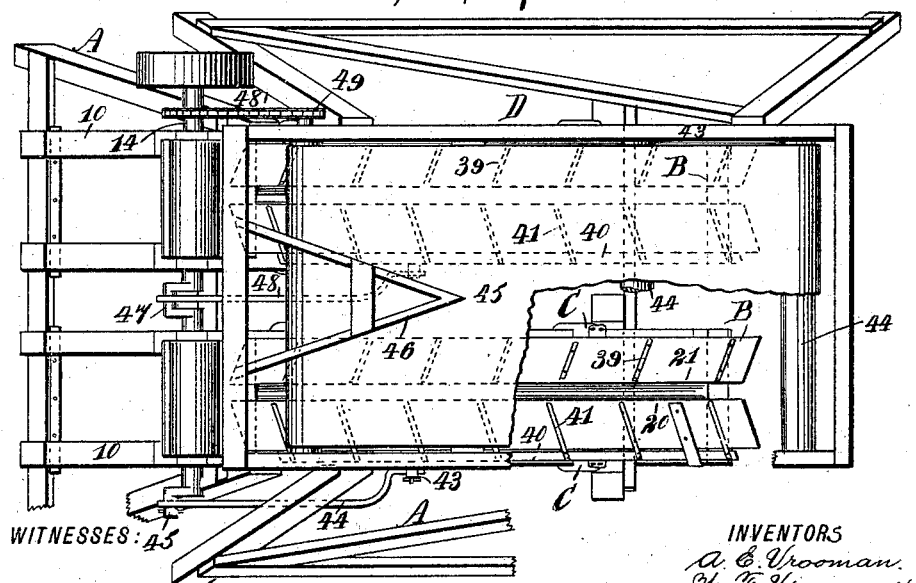

Figure 1 is a longitudinal vertical section through the machine, the section being taken substantially on the line 1 1 of Fig. 2. Fig. 2 is a transverse section through the machine, taken substantially on the line 2 2 of Fig. 1. Fig. 3 is an enlarged plan view of the upper portions of the topping-rollers and the gearing for actuating the same. Fig. 4 is a section through the adjustable topping-roller, the section being taken on the line 4 4 of Fig. 3. Fig. 5 is a transverse section through one side of the trough in which the onions are delivered, illustrating the manner in which the side portions of the trough may be adjusted. Fig. 6 is a side elevation of a double machine adapted to be driven by power and illustrating a feeding-apron employed in connection with the machine; and Fig. 7 is a plan view of the double machine, a portion of the feeding-apron being broken away.

In carrying out the invention a suitable base A is employed and side beams 10 are secured to the upper portion of the base, which side beams are given a downward and forward inclination. A hopper 11 in the single form of the machine is employed to receive the onions to be topped, and the said hopper at its forward end has an opening therein for the escape of the onions, which opening is controlled by a valve or a gate $11^a$. The aforesaid hopper rests, preferably, at its rear end upon a strap 12, extending from one side beam of the machine to the other, and at its lower or forward end the hopper is preferably supported upon a housing 13, which housing is provided with a cover $13^a$, having a hinge connection with the body, and the said housing is adapted to protect a driving-shaft 14 (shown in Fig. 3) and the gearing connected with said shaft.

Slightly below the drive-shaft 14 and the aforesaid housing 13 a box 15 is secured to the side beams of the frame, extending from one to the other, and the said box is provided with a sliding block 16, which sliding block is operated through the medium of a set-screw 19, located at one side of the machine, the set-screw having a follower 18 secured to its inner end, which has bearing against a spring 17, engaging with the outer end of the box 16. A similar box $15^a$ is located at the lower end of the inclined beams 10 of the main frame, and in the fixed portion of the box a topping-roller 20 is journaled, while a second and parallel roller 21 is journaled in the adjustable blocks or sections 16 of the said boxes.

In order that dust and dirt shall not enter between the rollers 20 and 21 and the portions of the boxes 15 and $15^a$ in which they are journaled, the roller-receiving sections of the boxes are provided with an annular groove 22, as shown in Fig. 4, and the ends of the rollers have likewise an annular groove 23 made therein in order that the flange of the bearing portion of the boxes formed by the grooves 22 may enter the grooves 23 in the said rollers, and each roller is provided at its upper end with a trunnion 24, the trunnions being passed through the bearing portions of the upper box 15, and the adjustable roller 21 has a gear 25 secured to its trunnions, meshing with a gear 26, attached to the trunnion of the fixed roller 20, and the trunnion of this latter roller is further provided with a beveled pinion 27, which meshes with a correspondingly-shaped gear 28, secured on the driving-shaft 14, and in the single form of the machine the said driving-shaft is preferably turned through the medium of a hand-wheel 29 or the equivalent of the same.

A trough B is located over the topping-rollers, following the inclination of the said rollers, and the trough extends from the lower end of the hopper 11 to a point beyond the lower ends of the rollers. The trough is preferably made in two side sections 30, and each side section may be made of wood, having a metal plate 31 secured upon its inner face. The sides of the trough are independent of each other, and each side is adjustable, so that the trough may be given any desired inclination to or from the rollers, and whereby also the space between the lower edges of the sides of the trough may be increased or diminished, according to the size of the onions to be topped, and the topping-roller 21 is made adjustable for the same purpose. When the tops are very tough or old, the topping-rollers are placed very close together, so as to quickly and effectually remove the tops from the onions.

The adjustment of the sides of the trough is accomplished through the medium of brackets C, which serve to connect the said sides with the side beams of the machine-frame. Each bracket comprises an angular plate 32, secured to the bottom of the side portion of the trough, as shown in Fig. 5, the said plate being angular, and the vertical member of the plate has horizontal elongated openings 33 made therein, and this plate is adapted for engagement with a second plate 34, the latter plate being secured to the side beams of the frame. The lower or fixed plate 34 of each bracket is curved inwardly at its upper end to meet the vertical portion of the upper plate member 32, and the said curved portion of the fixed plate 34 of each bracket has elongated openings 35 made therein, preferably at a right angle to the openings 33 in the upper plate member 32, and adjusting-bolts 36 are passed through the registering slots or openings in the two members of the bracket, as shown in Fig. 5. By this means it is evident that a speedy and convenient adjustment of the trough may be made relative to the rollers to meet any emergency. The trough may not only be adjusted to and from the topping-rollers, but it may be narrowed or widened, as occasion may demand.

It frequently happens that sundry portions of the tops of the onions and the loose skin from the bulbs of the onions will cling to the topping-rollers 20 and 21, interfering with their proper action. In order to keep the rollers perfectly clean, we have provided scrapers 37, which engage with the bottom portion of the said rollers near their centers, as shown particularly in Fig. 2, and these scrapers are adjustably attached to the side beams of the machine-frame through the medium of bolts 38 or their equivalents, so that the scrapers may be adjusted uniformly with the adjustment of the rollers. In the drawings each of these scrapers comprises a wooden back and a metal front, the latter being carried to an engagement with the rollers; but the construction of the scrapers, as likewise the construction of the sides of the trough, may be changed as required.

One side of the trough B is provided with a series of baffle strips or ribs 39, placed transversely thereon, and the object of these strips is to force the onions when passing down the trough to assume different positions, insuring the tops of the onions entering the space between the topping-rollers at some point in the length of the latter. At times the rollers will hold small portions of the onion-tops with force sufficient to retard the progress of the onions, but not sufficient to tear such portions off. In order to release these portions, I provide a bar 40, held to slide upon the side of the trough opposite the side having the ribs or strips 39. Suitable guides 42 are provided for the bar 4. Fingers 41 are attached to the bar at desired intervals and extend transversely across the inner face of the side of the trough to which the reciprocating bar is applied. This bar is given movement by an arm 43, attached to its rear face and extended downward at one side of the machine, the said arm being connected by a pitman 44 with a crank-arm 45 on the driving-shaft 14.

In Figs. 6 and 7 we have illustrated a machine in which two sets of topping-rollers and two troughs are employed. The hopper 11 in this form of the machine is dispensed with, and instead a conveyer D is used, the said conveyer being supported over the top portion of the machine, and it comprises a box-body 43$^a$, provided with rollers 44$^a$, and an endless apron 45$^a$, passed over the said rollers, a space being made to intervene the rear end of the box and the rear roller, and the said space is located over the upper or rear portion of the trough B.

A V-shaped division-board 46 is secured to the box of the conveyer at its rear end, and the said division-board extends forwardly over the apron 45$^a$, as shown in Fig. 7, whereby the onions which are placed upon the apron will be directed to both sets of topping-rollers. The driving-shaft 14 under this form of the machine is provided with a central crank-arm 47 in addition to the end crank-arm 45, so that two pitmen may be actuated from the shaft—namely, the inner pitman 48, for actuating the agitating-bars of the troughs, and the outer pitman 44—and the endless apron of the conveyer is driven through the medium of an endless belt 48$^a$, which is passed over pulleys 49 and 50, attached one to the rearmost roller 44ᵃ of the conveyer and the other to the driving-shaft 14.

It is evident that under this construction of machine the onions may be topped uniformly and delivered from the machine perfectly clean and in good condition for market, all of the dust and dirt usually clinging to onions removed from the soil, together with the tops detached from the onions being discharged from the machine, accumulating beneath the same.

It will be seen that the purpose of the trough is to prevent the rolls from engaging the onions. If the rolls engage the onions, the onions will be bruised and peeled, but by resting them in the trough the tops only are permitted to engage the rolls.

Having thus described our invention, we claim as new and desire to secure by Letters Patent—

1. In a machine for topping vegetables, parallel topping-rollers, a trough located over the said topping-rollers and having an opening over the space between said rollers, a mechanism for driving the rollers, and baffle projections formed upon the trough and adapted to be engaged by the vegetables in their progress along the trough, as and for the purpose specified.

2. In a machine for topping vegetables, a support, parallel topping-rollers journaled in the said support and having an inclined position, one of the said rollers being adjustable, a trough located over and following the inclination of the said rollers, the said trough comprising independent side pieces adjustably connected with the said support, the opening between the side pieces of the trough being over the space between the rollers, baffle projections formed upon the upper or receiving faces of the trough, and adjustable scrapers arranged to engage with the under surface of the aforesaid rollers, as and for the purpose specified.

3. In a machine for topping vegetables, adjustable topping-rollers, a trough supported over the said topping-rollers and having an opening registering with the space between the rollers, fingers extending along one side of the trough transversely of the same in direction of its bottom opening, a bar connecting the said fingers, a driving device for the said rollers, and a connection between the said driving device and the finger-carrying bar, as and for the purpose set forth.

4. In a machine for topping vegetables, a frame, two driven rollers mounted on the frame, a plate located at each side of the rollers, the plates being carried by the frame and each formed with two slots, two additional plates also formed with slots, the said additional plates being respectively secured to the first plates, a trough-section secured to each of the latter plates, and a blade-plate secured to each trough-section, the blade-plates being inclined inwardly and downwardly toward the rollers, substantially as described.

5. In a machine for topping vegetables a frame having two parallel rollers engaging the tops to pull them from the vegetables, and a trough running over the rollers, the trough having a longitudinal opening in its lower portion leading directly to the space between the rollers by which trough the vegetables are held so that only their tops may engage the rollers, substantially as described.

6. In a machine for topping vegetables, a frame having two parallel topping-rollers, a trough running above said rollers and having a longitudinal opening leading directly from the space between the rollers and holding the vegetables out of contact with the rollers, and means for releasing the vegetables from the rollers as the tops are drawn between the same, substantially as described.

ARBA E. VROOMAN.
WARREN F. VROOMAN.

Witnesses to signature of Arba E. Vrooman:

HARLEY BRANDENBURG,
SUE BRANDENBURG.

Witnesses to signature of Warren F. Vrooman:

ELAN G. KINGMAN,
FRANK B. WETMORE.